Nov. 17, 1964   F. R. DANSFIELD   3,156,967
LATHE TOOL HOLDER
Filed July 13, 1962

INVENTOR.
FRANK R. DANSFIELD
BY Burton H. Baker
Agent 3,156,967
LATHE TOOL HOLDER
Frank R. Dansfield, 1701 Pine St., St. Joseph, Mich.
Filed July 13, 1962, Ser. No. 209,682
1 Claim. (Cl. 29—96)

This invention pertains to a new and improved lathe tool holder.

One object of my invention is to provide a lathe tool holder for right-hand as well as left-hand use.

Another object of my invention is to provide a lathe tool holder which presents a novel, simple and efficient holder for a cutting tool whereby a tool may be quickly inserted and rigidly maintained in its cutting position, and for the making of any of several cutting operations, the tool may be quickly removed and replaced in another cutting position without requiring the turning or repositioning of the tool holder.

Other objects and advantages of my invention will be apparent from the following description, taken in connection with the accompanying drawing, wherein.

Figure 1:
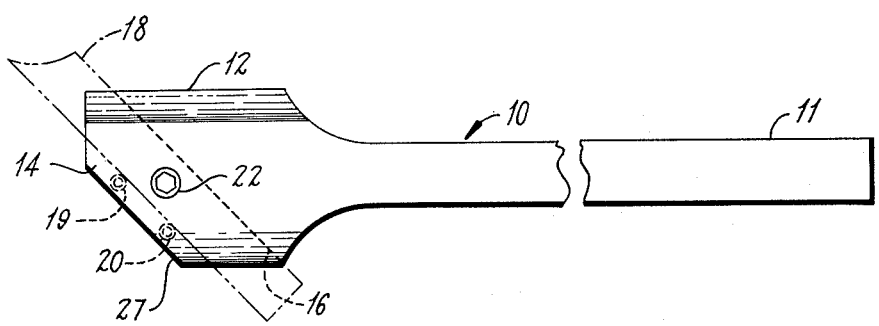
FIGURE 1 is a plan view of the improved cutting tool holder of the present invention, shown with a cutting tool in position therein.
Figure 2:
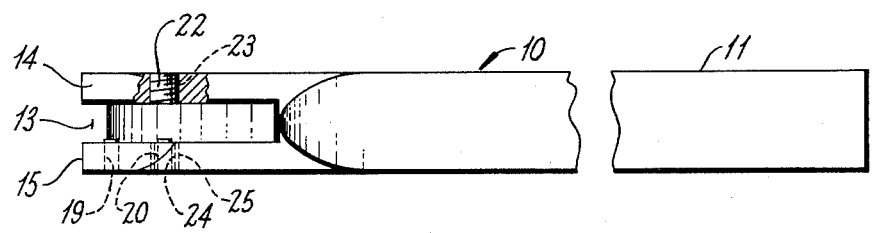
FIGURE 2 is a side elevation of the cutting tool holder.
Figure 3:
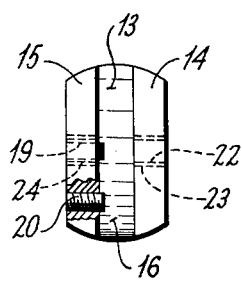
FIGURE 3 is an end elevation of the cutting tool holder, taken of the left end of the holder as shown in FIGURE 1.

My invention finds its best use in that it replaces the three conventional cutting or turning tool holders, described as the straight shank, the left-hand offset shank and the right-hand offset shank tool holders. I have found the invention particularly valuable and convenient in performing the multiple operations of internal boring, end facing and external cutting on wheels and the like. The multiple uses of the single tool of the present invention result in considerable savings in time and increased work output.

Referring now to the drawing, tool holder 10 is seen to comprise a shank portion 11 of conventional rectangular cross-section. One end 12 of the shank is preferably enlarged, and this enlarged end is divided in half by a slot 13, forming an upper leg 14 and a lower leg 15 of the tool holder 10. The base 16 of slot 13 is seen to be inclined to the longitudinal axis of the holder, preferably approximately 45 degrees.

A conventional cutting tool 18 is positioned and secured in slot 13, as shown in phantom lines in FIGURE 1. The cutting tool is positioned against the base 16 of slot 13 by means of positioning posts 19, 20 which are parallel with slot base 16. For convenience, positioning posts 19 and 20 may be conventional hex-socket set screws, but of course, other means may be employed.

The cutting tool 18 is positively secured in place by an upper screw 22 extending through a threaded opening 23 in upper leg 14, and by a lower screw 24 extending through a threaded opening 25 in lower leg 15. As will be apparent, the inner ends of these screws 22, 24 firmly press into the upper and lower surfaces of cutting tool 18 when the screws are turned. In order to minimize the outer dimensions of the tool holder assembly, short hex-socket set screws are used but, of course, conventional square-head set screws may be employed.

Each of the upper leg 14 and lower leg 15 has one corner thereof removed, providing a tapered corner 27. This provides further clearance for the tool holder during use, especially in internal boring operations.

One slight modification of this design has proved very successful as a straight boring tool holder. In this modification, the slot 13 rather than being parallel to the surfaces of upper leg 14 and lower leg 15, is rather inclined at a slight angle from horizontal. This angle is approximately 10 degrees and this places the cutting end of the tool slightly higher, at the proper position for boring. Of course, this modification will not provide the best use as an alternate right-hand and left-hand tool holder, but does serve better when a tool holder is desired for boring purposes solely.

Thus, it will be seen I have provided a new and useful lathe cutting tool holder, one which is economical to manufacture and which provides for maximum convenience. As described above, my one tool holder replaces the three conventional tool holders normally required, providing substantial economies of material and time.

While I have shown and described one embodiment of my invention, it is to be understood that it is capable of many modifications. Changes, therefore, in the construction and arrangement may be made without departing from the spirit and scope of the invention as defined in the appended claim.

I claim:

A holder for a lathe cutting tool, comprising; an elongated shank of substantially rectangular cross-section, one end of said shank being enlarged and having a slot therein, said slot being inclined to the longitudinal axis of said shank; an upper leg and a lower leg of substantially equal size formed in said enlarged end by said slot, each of said legs having a corner thereof removed along a line substantially parallel to the base of said slot; a plurality of threaded positioning means removably secured in one of said legs spaced equally from the base of said slot and forming a positioning surface overlying a tool positioned in the slot; each of said legs having a threaded opening therein, said openings being substantially directly opposed and spaced inwardly from the positioning means toward the base of said slot; and a threaded securing member in each of said threaded openings, whereby a cutting tool may be removably positioned and secured within said slot to permit reversible right-hand and left-hand use of said holder.

References Cited by the Examiner

UNITED STATES PATENTS

| 652,015 | 6/00 | Cunningham. |
| 854,100 | 5/07 | Meadoworoft _____ 29—96 |
| 948,904 | 2/10 | Schroepfer _____ 142—56 X |
| 950,329 | 2/10 | Hillenbrand. |
| 1,237,021 | 8/17 | Cooke. |
| 2,031,135 | 2/36 | Smith _____ 142—42 |
| 2,414,881 | 1/47 | Hollis _____ 29—96 |

FOREIGN PATENTS

| 5,877 | 4/89 | Great Britain. |
| 544,990 | 6/56 | Italy. |

WILLIAM W. DYER, JR., *Primary Examiner.*

EARL EMSHWILLER, *Examiner.*